United States Patent
Whyte

(10) Patent No.: US 10,765,086 B2
(45) Date of Patent: Sep. 8, 2020

(54) ADJUSTABLE ANIMAL GARMENT

(71) Applicant: DOG E LITES INC., Saint-Laurent (CA)

(72) Inventor: Robin Whyte, L'lle-Perrot (CA)

(73) Assignee: DOG E LITES INC., Saint-Laurent (CA)

(*) Notice: Subject to any disclaimer, the term of this patent is extended or adjusted under 35 U.S.C. 154(b) by 137 days.

(21) Appl. No.: 15/149,545

(22) Filed: May 9, 2016

(65) Prior Publication Data

US 2016/0324118 A1 Nov. 10, 2016

Related U.S. Application Data

(60) Provisional application No. 62/158,780, filed on May 8, 2015.

(51) Int. Cl.
*A01K 13/00* (2006.01)
(52) U.S. Cl.
CPC .................. *A01K 13/006* (2013.01)
(58) Field of Classification Search
CPC ... A01K 13/006; A01K 27/002; A01K 13/008
USPC ....................................................... 119/850
See application file for complete search history.

(56) References Cited

U.S. PATENT DOCUMENTS

| | | | |
|---|---|---|---|
| 9,374,983 B1* | 6/2016 | Kuehr ................. | A01K 13/006 |
| 2007/0056530 A1* | 3/2007 | Nassour .............. | A01K 13/006 |
| | | | 119/850 |
| 2013/0306001 A1* | 11/2013 | Bordeaux ........... | A01K 13/006 |
| | | | 119/850 |
| 2014/0174381 A1 | 6/2014 | Cozzolino | |
| 2014/0318478 A1 | 10/2014 | Cruz | |
| 2015/0020755 A1* | 1/2015 | Chortyk-White .... | A01K 13/006 |
| | | | 119/850 |
| 2015/0083054 A1* | 3/2015 | Blizzard ............. | A01K 13/006 |
| | | | 119/850 |

* cited by examiner

*Primary Examiner* — Peter M Poon
*Assistant Examiner* — Jeffrey R Larsen
(74) *Attorney, Agent, or Firm* — Nixon Peabody LLP

(57) ABSTRACT

An adjustable animal garment, the garment comprising a tubular body defining a front opening, a rear opening, a chest portion and a back portion. The garment further comprises a plurality of discrete elasticized areas formed along a length of at least the chest portion or the back portion and configured to render said at least chest portion or back portion stretchable substantially transversely to the length of the chest portion or the back portion between an extended position and a rest position; and a fastening system connectable to the chest portion or the back portion, said fastening system being adjustably closing an opening along the length of the chest portion or the back portion.

21 Claims, 3 Drawing Sheets

ADJUSTABLE ANIMAL GARMENT

CROSS-REFERENCE TO RELATED APPLICATION

This application claims the benefit of U.S. Provisional Patent Application No. 62/158,780, filed May 8, 2015, entitled "Adjustable Animal Garment" which is hereby incorporated by reference in its entirety.

FIELD OF THE DISCLOSURE

The present invention relates to animal garments. More particularly, the present invention relates to an adjustable animal garment incorporating elasticized sections in order to adjust the garment onto the animal.

BACKGROUND

Pet apparel and accessories represent an increasingly important category within the pet industry as evidenced by the rapidly growing consumer demand for new styling, better coverage, better fit range, more flexibility, higher quality, value added features and trendy designs.

Demographic shifts in regards to smaller human families and a higher proportion of the population who are finding themselves as empty nesters is moving at an unprecedented rate. This shift is contributing to a heightened importance of pets within the family unit, taking to some extent the place of children and providing around the clock companionship within the family unit and for singles. In this context, the humanization of pets, and by extension the humanization of the pet accessory industry, is in direct correlation to this powerful trend. Pet owners are increasingly sensitive to the potential discomforts experienced by their pets, and looking for solutions much in the same way they would for a human. These same owners are also demonstrating a noticeable sense of pride in procuring and boasting superior quality, good looking and comfortable pet products for their dog or cat.

Within the pet apparel and accessory categories, the ability to properly adjust a garment or any other item onto a dog, for example, to achieve a comfortable, heat efficient and good looking fit is one of the biggest challenges that pet owners face today. Improperly-fitting pet apparel is the leading reason why many dogs and cats do not like to wear them despite the discomforts of extreme cold, direct sun, etc, causing worry to their owners and risk to the animals. And when they do wear the ill-fitting garment, their discomfort causes them to move unnaturally or not at all, and focus their efforts on trying to remove the garment.

In addition, the difficulty that many pet owners experience while attempting to fit their pet info an ill-fitting garment, or a garment with a complex closure system, or a garment without adjustability or elasticity in multiple areas can be significant.

Moreover, certain animal breeds in addition to pets at the extreme ends of the size scale and/or proportion scale do not even fit in the apparel or accessories on the market today.

The present invention provides a solution that can be applied to each challenging component to create a great fitting item, which can be applied to any type of pet apparel (shirt, coat, wrap, and the like) and other accessories such as footwear, collars and harnesses where extendibility positively impacts comfort, fit, length and/or look.

The following are some contributing factors to the need for the present invention:

Brutal and unpredictable winter conditions mean that even pets who do not like to wear weather protection, especially short haired pets, still need to;

The challenges of proper fitting to the varied shapes of pets, and especially mixed breed dogs with disproportionate shapes as well as dogs with excess weight; and Consumers' increasing desire to dress their pets in comfort and style, the way they would dress their child or themselves.

Hence, in light of the aforementioned, there is a need for a highly adjustable animal garment which, by virtue of its design and components, would be able to overcome some of the above-mentioned prior art concerns.

SUMMARY

One object of the present invention is to provide a solution to at least one of the above-mentioned prior art drawbacks.

The present invention relates to an adjustable animal garment that has the ability to properly adjust a garment onto an animal, preferably a dog or a cat, to achieve a comfortable, heat efficient, easy to use and good looking fit.

In accordance with an aspect of the present invention, there is provided an adjustable animal garment comprising:
 a tubular body comprising:
  a front opening;
  a rear opening;
  a chest portion spanning from the neck to the base of the garment; and
  a back portion;
 a plurality of discrete elasticized areas formed along a length of at least the chest portion or the back portion and configured to render said at least chest portion or back portion stretchable substantially transversely to the length of the chest portion or the back portion between an extended position and a rest position; and
 a fastening system connectable to the chest portion or the back portion, said fastening system adjustably closing an opening along the length of the chest portion or the back portion.

In some implementations, the tubular body further comprises a stretchable aperture formed in the chest portion and sized to allow passage of external members of the animal.

In some implementations, edges of the aperture comprise poly/spandex fabric.

In some implementations, the tubular body further includes a hood.

In some implementations, the tubular body further includes a stretchability cord integratable to at least the front opening or the rear opening, or on the hood opening.

In some implementations, the stretchability cord comprises an elasticized hem.

In some implementations, the plurality of discrete elasticized areas comprises elastics insertable in the chest portion or the neck portion or the back portion or on the hood portion.

In some implementations, the fastening system comprises a hook and loop fastener.

In some implementations, the stretchable aperture has a dog-bone shape.

In some implementations, the dog-bone shape comprises a tapered middle portion and a pair of opposite rounded extremities.

The components, advantages and other features of the invention will become more apparent upon reading of the following non-restrictive description of some optional configurations, given for the purpose of exemplification only, with reference to the accompanying drawings.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present invention illustrated in other figures can be easily inferred therefrom. The embodiments, geometrical configurations, materials mentioned and/or dimensions shown in the figures are optional, and are given for exemplification purposes only.

Furthermore, in the context of the present invention, the expressions "animal", "dog", "cat", "pet", as used herein should not be taken as to limit the scope of the present invention to these animals in particular. The same applies for any other mutually equivalent expressions, such as "elastic", "bungee", "polyester/spandex", for example, as also apparent to a person skilled in the art. Furthermore, and also in the context of the present description, the expressions "hook and loop", "Velcro™", "fastening system" may also be used interchangeably, as well as "polar fleece", "polyethylene terephthalate", "synthetic fibers" when referring to the fabric. These expressions encompass all other kinds of materials, objects and/or purposes with which the present invention could be used and may be useful, as can be easily understood.

Figure 1A:
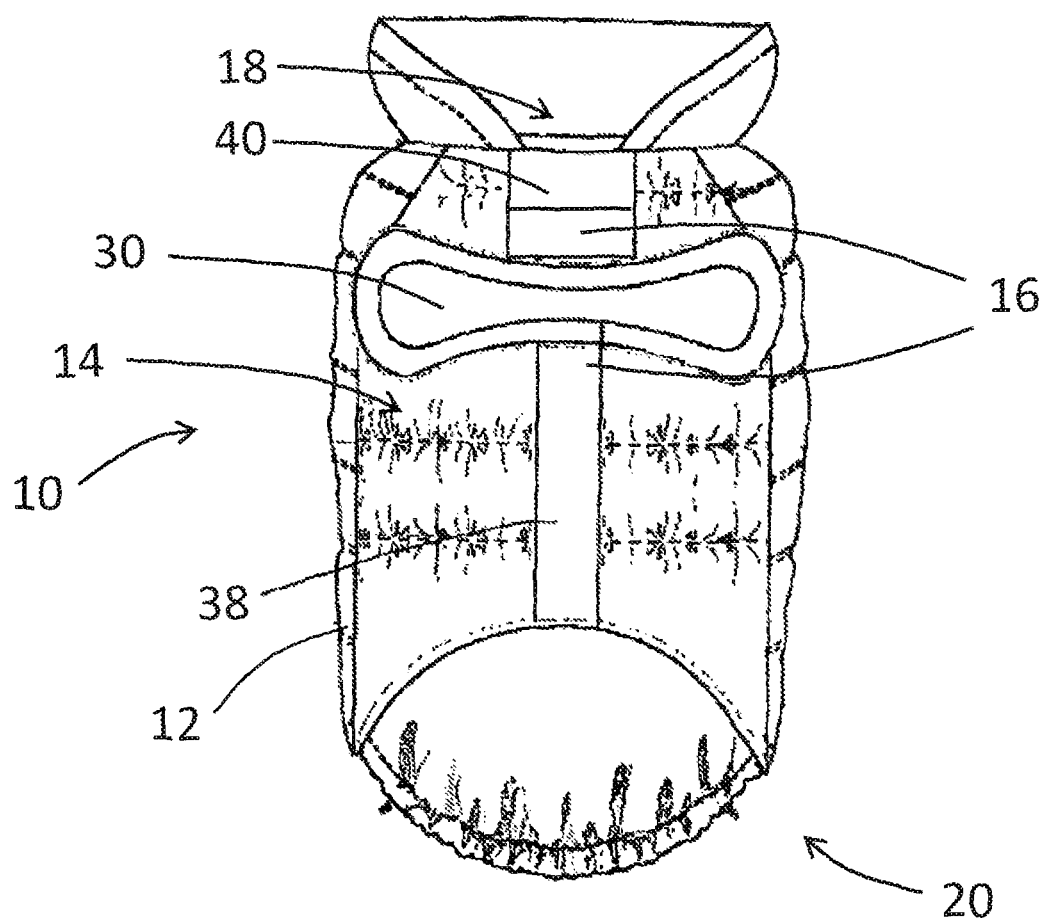
FIG. 1A is a front elevation view of an animal garment according to an embodiment of the present invention.
Figure 1B:
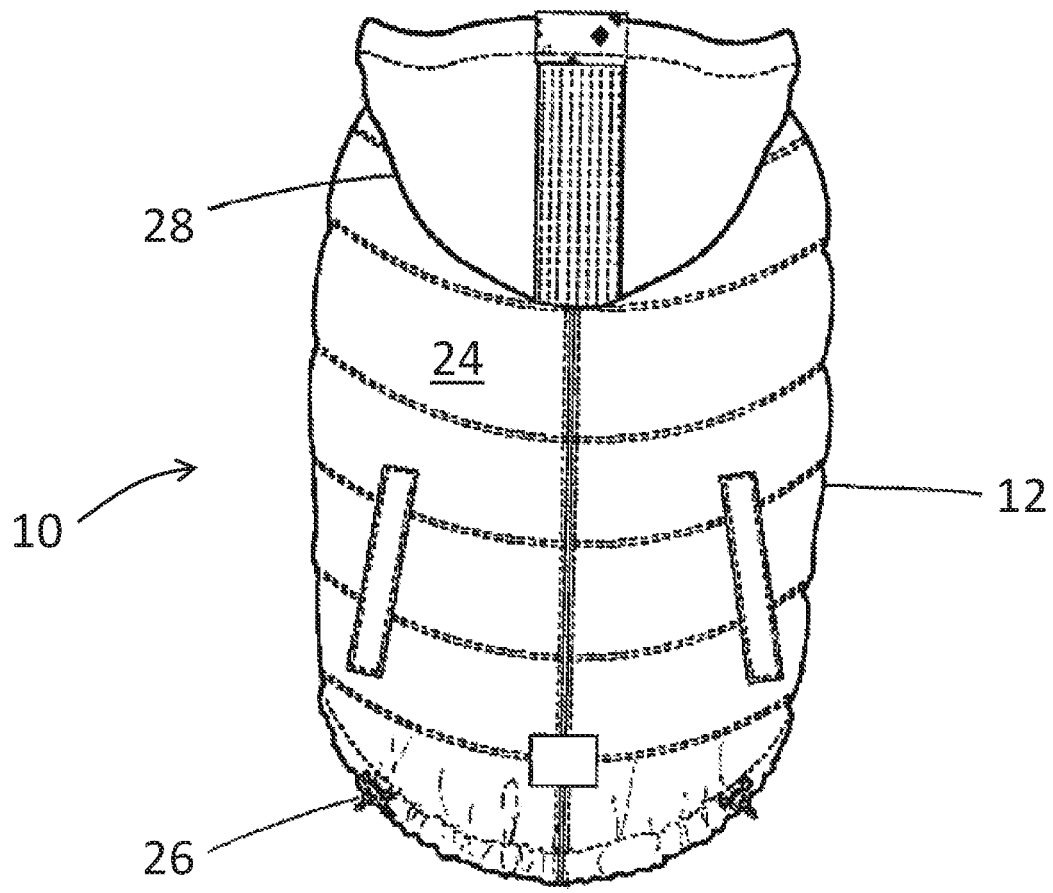
FIG. 1B is a rear elevation view of the animal garment shown in FIG. 1A.
Figure 2A:
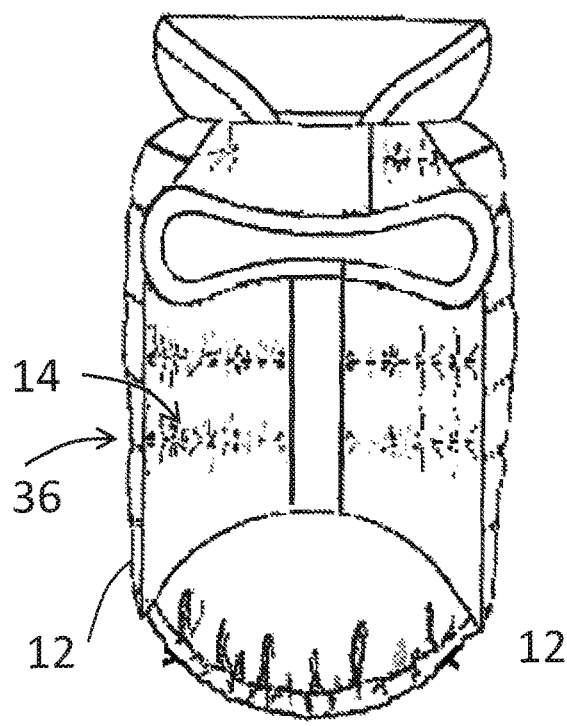
FIG. 2A is a front elevation view of the animal garment shown in FIG. 1A in a rest position.
Figure 2B:
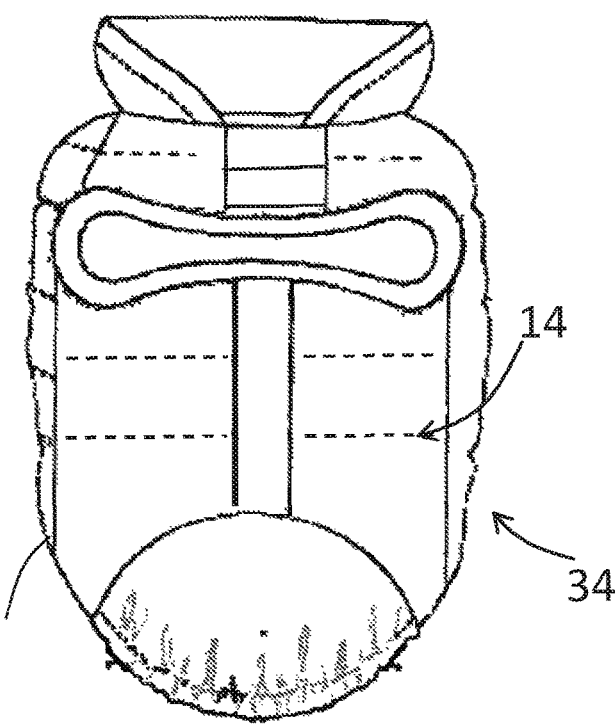
FIG. 2B is a front elevation view of the animal garment shown in FIG. 1A in an extended position.

As shown in FIGS. 1A to 2B, there is provided an adjustable animal garment 10 comprising a tubular body 12, a plurality of discrete elasticized areas 14, and a fastening system 16.

According to an embodiment of the present invention, the tubular body 12 comprises a front opening 18 to surround the neck of the animal and a rear opening 20 to allow passage of the rear members of the animal. The tubular body also defines a chest portion 22 preferably covering the neck just below the throat, chest, abdomen and upper arms of the forelegs of the animal and a back portion 24, preferably covering the back, neck, loin, and upper thighs of the hind legs. The front opening 18 and the rear opening 20 can include additional elasticized portions or an integratable stretchability cord 26 to adjust the size of said openings 18, 20 according to the size of the animal. The tubular body 12 may also include a hood 28 to provide additional protection from cold weather and/or direct sun, and may include an elasticized option. An optional elasticized hem can further enhance fit around the openings 18, 20. The chest portion 22 further comprises a stretchable aperture 30 sized to allow passage of the forelegs of the animal. The aperture 30 may have a dog-bone shape wherein the middle portion is tapered and the two extremities are rounded to cover the vast majority of the underside of the animal. In an alternative embodiment, the aperture 30 may also comprise two discrete openings for each foreleg. The edges of the aperture 30 may also comprise poly/spandex fabric for an added adjustability of the animal garment 10. In other embodiments, the aperture 30 can be wish-bone shaped. This aperture 30 allows for chest and belly/abdomen coverage while leaving the external member area free, rendering walking movement unimpeded by the garment.

The plurality of discrete elasticized areas 14 formed along a length of the chest portion 22 are configured to render said chest portion 22 stretchable substantially transversely to the length of the chest portion 22 between an extended position 34 and a rest position 36. In an alternative embodiment, the discrete elasticized areas 14 may also be formed along a length of the back portion 24. These elasticized areas 14 together with the fastening system 16 typically cover approximately 30% of the circumference of the garment. Elasticized areas 14 may also be inserted on either side of the front opening 18, thereby extending the adjustability of the neck size as well. The discrete elasticized areas 14 may also comprise elastics ("elasticized inserts") insertable in the chest portion 22 or the back portion 24. The elastic material may be substituted with any other material such as bungee, spandex, etc., as apparent to a person skilled in the art. Elasticized inserts may be integrated into the garment and are not a detachable piece which avoids loss and improve safety issues. They are typically made of or covered with the identical fabric of the garment so it completely matches and complements the look and feel of the item.

In operation, when the animal garment 10 is in the rest position 36, the elasticized areas 14 are not stretched and the animal garment 10 is the same size as a non-elasticized garment. However, the fit is slightly snugger since the gathered nature of the design will not hang and tends to hug the animal's body. With the elasticized areas 14 in the extended position 34, the animal garment 10 expands significantly in actual width and/or length and also in terms of the flexibility it provides to properly adapt to each animal's unique curves, regardless of thickness or disproportionate measurements. This allows for greater freedom of movement.

The fastening system 16 connectable to the chest portion 22 also provides additional adjustability. In some embodiments, the fastening system 16 may also be connected to the back portion 24. The fastening system 16 being adjustable depending on the animal's size to secure the animal garment 10 onto the animal's body by closing an opening along the length of the chest portion 22 or the back portion 24. The fastening system 16 may comprise a hook and loop fastener ("Velcro™") or any other adjustable fastener as apparent to a person skilled in the art. In other embodiments, the fastening system 16 comprises a chest fastener 38 and a neck fastener 40. The closure of the chest fastener 38 and the neck fastener 40 further creates the dog-bone shaped aperture 30.

The simple design of the animal garment 10 makes it easy to put the garment 10 on the animal by limiting the process to 2 steps:

Step 1—Lay garment 10 on animal

Step 2—Attach fastening system 16.

The above-described embodiments are considered in all respect only as illustrative and not restrictive, and the present application is intended to cover any adaptations or variations thereof, as apparent to a person skilled in the art. Of course, numerous modifications could be made to the above-described embodiments without departing from the scope of the invention, as defined in the appended claims.

The invention claimed is:

1. An adjustable animal garment, the garment comprising:
   a tubular body comprising:
      a front opening;
      a rear opening;
      a chest portion; and
      a back portion;
   a plurality of discrete elasticized areas formed along a length of at least one of the chest portion and the back portion, the plurality of discrete elasticized areas being positioned adjacent one another on a same surface along said length, and configured to render said at least one of the chest portion and the back portion stretchable substantially transversely to the length of the at least one of the chest portion and the back portion between an extended position and a rest position; and
   a fastening system extending along the chest portion of the tubular body, said fastening system being configured for selectively closing an opening along the length of the chest portion,
   wherein the fastening system, upon closing the opening, defines a stretchable aperture formed in the chest portion and sized to allow passage of external members of the animal, and
   wherein the fastening system comprises a neck fastener extending in a lengthwise direction of the tubular body on a first side of the stretchable aperture and a chest fastener extending in the lengthwise direction of the tubular body on a second side of the stretchable aperture.

2. An adjustable animal garment as claimed in claim 1, wherein edges of the aperture comprise polyester spandex fabric.

3. An adjustable animal garment as claimed in claim 1, wherein the tubular body further includes a hood.

4. An adjustable animal garment as claimed in claim 1, wherein at least one of the front opening and the rear opening comprises a stretchable cord integrated thereabout.

5. An adjustable animal garment as claimed in claim 4, wherein the stretchable cord comprises an elasticized hem.

6. An adjustable animal garment as claimed in claim 1, wherein the plurality of discrete elasticized areas comprises elastics insertable in at least one of the chest portion and the back portion.

7. An adjustable animal garment as claimed in claim 1, wherein the fastening system comprises a hook and loop fastener.

8. An adjustable animal garment as claimed in claim 1, wherein the stretchable aperture has a dog-bone shape.

9. An adjustable animal garment as claimed in claim 1, wherein the stretchable aperture has a wish-bone shape.

10. An adjustable animal garment as claimed in claim 8, wherein the dog-bone shape comprises a tapered middle portion and a pair of opposite rounded extremities.

11. An adjustable animal garment as claimed in claim 9, wherein the wish-bone shape comprises a tapered middle portion and a pair of opposite rounded extremities.

12. The adjustable animal garment as claimed in claim 1, wherein the back portion is formed of a unitary piece.

13. An adjustable animal garment as claimed in claim 1,
   wherein the neck fastener is a hook and loop fastener;
   wherein the chest fastener is a hook and loop fastener;
   wherein the stretchable aperture has a dog-bone shape; and
   wherein the back portion is formed of a unitary piece.

14. An adjustable animal garment as claimed in claim 13, wherein the stretchable aperture comprises a tapered middle portion and a pair of opposite rounded extremities.

15. An adjustable animal garment as claimed in claim 1, wherein the fastening system extends along a lengthwise center line of the chest portion of the tubular body.

16. An adjustable animal garment as claimed in claim 15, wherein the plurality of discrete elasticized areas is formed along the length of the chest portion and is located to lateral sides of the neck fastener and the chest fastener, at least two discrete elasticized areas being formed on the same surface on either sides of the neck fastener and the chest fastener.

17. An adjustable animal garment as claimed in claim 1, wherein the plurality of discrete elasticized areas is formed along the length of the chest portion and is located to lateral sides of the neck fastener and the chest fastener.

18. An adjustable animal garment as claimed in claim 6, wherein the fastening system extends along a lengthwise center line of the chest portion of the tubular body, and wherein the elastics are located to lateral sides of the chest fastener.

19. An adjustable animal garment as claimed in claim 16, wherein the plurality of discrete elasticized areas is positioned adjacent one another on a same surface along the length of the chest portion.

20. An adjustable animal garment as claimed in claim 18, wherein the elastics are spaced apart along the length of the chest portion and extend transversely to the lengthwise center line.

21. An adjustable animal garment as claimed in claim 20, wherein the discrete elasticized areas are defined by the elastics extending transversely to the lengthwise center line.

* * * * *